US012800800B2

(12) United States Patent
Hassan Firoozi et al.

(10) Patent No.: US 12,800,800 B2
(45) Date of Patent: Nov. 17, 2026

(54) METALENS ARRAY MODULE AND DISPLAY DEVICE HAVING SAME

(71) Applicant: Chiun Mai Communication Systems, Inc., New Taipei (TW)

(72) Inventors: Amir Hassan Firoozi, New Taipei (TW); Chen-Sheng Hsu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 197 days.

(21) Appl. No.: 18/385,723

(22) Filed: Oct. 31, 2023

(65) Prior Publication Data

US 2024/0241290 A1 Jul. 18, 2024

Related U.S. Application Data

(60) Provisional application No. 63/533,510, filed on Aug. 18, 2023, provisional application No. 63/470,167, (Continued)

(51) Int. Cl.
*G02B 3/00* (2006.01)
*B82Y 20/00* (2011.01)
(Continued)

(52) U.S. Cl.
CPC ............ *G02B 3/0056* (2013.01); *B82Y 20/00* (2013.01); *G02B 1/002* (2013.01); *G02B 1/10* (2013.01); *G02B 3/0043* (2013.01); *G02B 3/0068* (2013.01); *G02B 27/0172* (2013.01); *G02F 1/134318* (2021.01); *G02F 1/13439* (2013.01); *G02F 1/291* (2021.01); *G09G 3/344* (2013.01); *G02B 2027/0178* (2013.01); *G02B 2207/101* (2013.01); *G02F 2202/36* (2013.01)

(58) Field of Classification Search
None
See application file for complete search history.

(56) References Cited

U.S. PATENT DOCUMENTS 9,837,852 B1 12/2017 Barnes et al.
2014/0159614 A1* 6/2014 Hussain .............. G09G 3/3406 315/307

(Continued)

FOREIGN PATENT DOCUMENTS

CN 113050295 A 6/2021
CN 115453670 A 12/2022

(Continued)

*Primary Examiner* — Ryan Crockett
(74) *Attorney, Agent, or Firm* — ScienBiziP, P.C.

(57) ABSTRACT

A metalens array module and a display device are provided, the metalens array module includes at least one E-ink display module, at least one optical transparent substrate, a plurality of nanostructures, and at least one spacer. The plurality of nanostructures are arranged on the at least one optical transparent substrate, the plurality of nanostructures define one or more metalenses, the one or more metalenses are arranged in a predetermined arrangement; the spacer connects the at least one E-ink display module and the at least one optical transparent substrate, the spacer is disposed between the at least one E-ink display module and the at least one optical transparent substrate.

18 Claims, 14 Drawing Sheets

Related U.S. Application Data filed on May 31, 2023, provisional application No. 63/454,586, filed on Mar. 24, 2023, provisional application No. 63/439,685, filed on Jan. 18, 2023.

(51) Int. Cl.

| | |
|---|---|
| ***G02B 1/00*** | (2006.01) |
| ***G02B 1/10*** | (2015.01) |
| ***G02B 27/01*** | (2006.01) |
| ***G02F 1/1343*** | (2006.01) |
| ***G02F 1/29*** | (2006.01) |
| ***G09G 3/34*** | (2006.01) |

(56) References Cited

U.S. PATENT DOCUMENTS

| | | | | |
|---|---|---|---|---|
| 2016/0011353 | A1* | 1/2016 | Escuti | G02B 5/32 359/15 |
| 2017/0276993 | A1* | 9/2017 | Lo | G02F 1/133308 |
| 2019/0129233 | A1* | 5/2019 | Cheng | G02F 1/133608 |
| 2021/0141146 | A1* | 5/2021 | Melli | G02B 27/017 |
| 2021/0405255 | A1* | 12/2021 | Kress | G02B 1/002 |
| 2022/0146079 | A1* | 5/2022 | Tamma | G02B 27/0172 |
| 2022/0228918 | A1* | 7/2022 | Busnaina | G02B 1/002 |
| 2022/0239883 | A1* | 7/2022 | Wong | H04N 13/111 |
| 2023/0185086 | A1 | 6/2023 | Luo et al. | |
| 2024/0241380 | A1* | 7/2024 | Hassan Firoozi | G02B 3/0056 |

FOREIGN PATENT DOCUMENTS

| | | | |
|---|---|---|---|
| JP | 2022542172 | A | 9/2022 |
| KR | 1020220114804 | A | 8/2022 |
| WO | 2022177725 | A1 | 8/2022 |

* cited by examiner

METALENS ARRAY MODULE AND DISPLAY DEVICE HAVING SAME

CROSS-REFERENCE TO RELATED APPLICATIONS

This application claims priority to U.S. provisional Application No. 63/439,685 filed on Jan. 18, 2023, U.S. provisional Application No. 63/454,586 filed on Mar. 24, 2023, U.S. provisional Application No. 63/470,167 filed on May 31, 2023, and U.S. provisional Application No. 63/533,510 filed on Aug. 18, 2023 in the United States Patent and Trademark Office (USPTO), the contents of which are incorporated by reference herein.

TECHNICAL FIELD

The subject matter herein generally relates to optical technologies, and more particularly to a metalens array module and a display device.

BACKGROUND

Hands-free gadgets are slowly taking place of the relatively older technology like mobile phones, tablets, and laptops. Among these gadgets, AR glasses seem to be an appropriate alternative. However, there are issues that hinder the real-world applications of these smart glasses, such as low see-through transparency, short battery life, bulkiness, eyes fatigue, discomfort and so on. Besides, the available technologies like bird-bath (or pancake) offer very low transparency (the transparency is smaller than 20%). While free-form prisms have slightly improved the transparency, they cannot compare to fully transparent glasses in front of a user's eye. Further improvement has been made by diffractive waveguides which provide roughly 80% of transparency. However, the immerse feeling of watching a content is not fully obtained due to color distortion around the edge of the out-coupler.

Therefore, the best option is to avoid obstructing the forward view of the user's eyes and allow the user to see the world, without any semi-transparent objects in front of his/her eyes. Moreover, keeping the front space of an AR glasses clean of the optics essentially depends on the degree of freedom of the design of the optics that glasses use. All previously mentioned technologies are not able to leave the front area of the glasses off the optics which is mainly due to their lack of freedom of design.

Another approach is to use metasurfaces or what is so-called metalens which has the highest freedom of design and if well engineered can be placed at any positions of AR glasses.

Although, metalenses are still visible to human eyes since achieving 100% of transmission is not possible. Moreover, as the resolution of a transparent display increases its transparency decreases due to more compact electronics and pixel addressing matrix which are not fully transparent. Thus, we surmise that placing the metalens and display around an AR glasses frame which avoid blocking the forward view of the user can make an AR glasses very practical to use.

Furthermore, only a highly bright transparent display (>3000 nits) can be used for outdoor activities which make user's eye prone to damage easily. Therefore, utilizing extremely bright display is not an ultimate solution. On the other side, E-ink display which are reflective displays (~40%) and do not have backlight and can be readily illuminated via a simple LED arrangement. In other words, the light does not strike the eyes directly and the user feel comfortable looking at an E-ink display for hours. Therefore, outdoor activities during a sunny day is no longer an issue, on top of that, E-ink displays are very power efficient and frequent and daily recharging the battery is no longer needed.

DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Implementations of the disclosure will now be described, by way of embodiments only, with reference to the drawings. The disclosure is illustrative only, and changes may be made in the detail within the principles of the present disclosure. It will, therefore, be appreciated that the embodiments may be modified within the scope of the claims.

Unless otherwise defined, all technical terms used herein have the same meaning as commonly understood by one of ordinary skill in the art. The technical terms used herein are to provide a thorough understanding of the embodiments described herein but are not to be considered as limiting the scope of the embodiments.

Several definitions that apply throughout this disclosure will now be presented.

The term "coupled" is defined as connected, whether directly or indirectly through intervening components, and is not necessarily limited to physical connections. The term "substantially" is defined to be essentially conforming to the particular dimension, shape or other word that the term modifies, such that the component need not be exact. The term "comprising," when utilized, means "including, but not necessarily limited to", it specifically indicates open-ended inclusion or membership in the so-described combination, group, series, and the like.

Augmented Reality (AR) is a display technology that integrates virtual information with the real world. That is, based on the real world observed by the human eye, the virtual image information projected by an electronic device is integrated. Traditionally head-mounted AR display devices usually include an image capturing module and a display device for capturing images within the viewer's field of view, and project virtual image information to a preset position within the viewer's field of view according to the captured image.

Figure 1A:
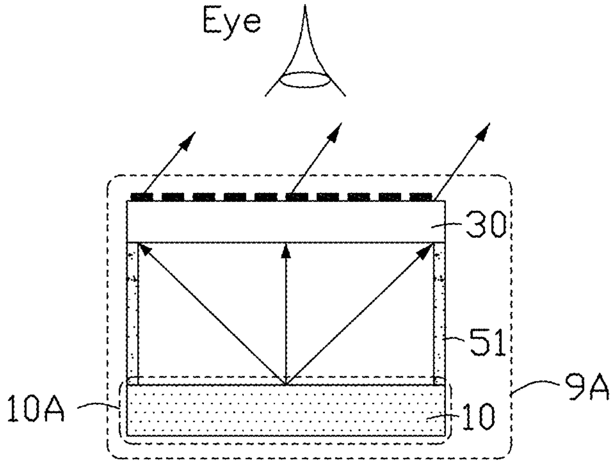
FIG. 1A illustrates at least one embodiment of a display device delivering or displaying AR/MR without a polarizer module.
Figure 1B:
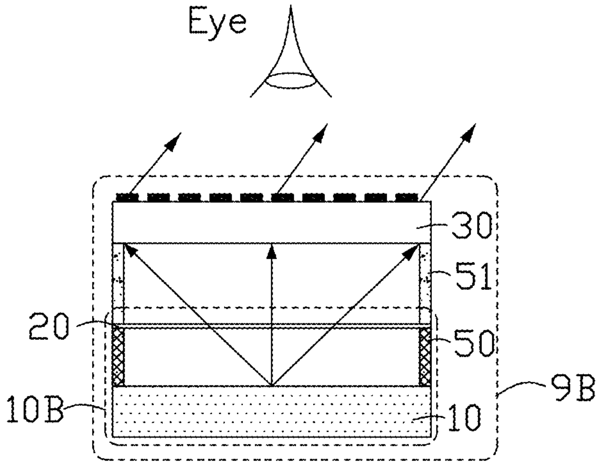
FIG. 1B illustrates at least one embodiment of a display device delivering or displaying AR/MR with a polarizer module.

As shown in FIG. 1A and FIG. 1B, at least one light emits from a micro display 10 and the micro display 10 displays a real image shown to observer's eyes. However, depending on the design and the distance between the micro display 10A, 10B and a metalens array 30, a real, virtual, or floating image or combination of them depends on the design can be formed. The micro display 10 and the metalens array 30 are uniformly separated using a spacer 51. At least one light beam composed by the at least one light may be restricted by an aperture (stop) 8. In the embodiment of FIG. 1A, it is no need to use a polarizer module 20 and an optically transparent glue 50 in the display device 90A. This scheme is used when isotropic nanostructures (41) are utilized as shown in FIG. 6A-6D.

As shown in FIG. 1A a polarizer-free device is used in the applications of delivering or displaying augmented/virtual reality (AR/VR) or mixed reality (MR). The metalens array 30, the spacer 51 is positioned between the E-ink display module 10 and the metalens array 30. The micro display 10A includes the E-ink display module 10 in the embodiment of FIG. 1A.

As shown in FIG. 1B a polarizer-dependent device is used in the applications of delivering or displaying augmented reality (AR) or mixed reality (MR). The spacer 51 is positioned between the polarizer module 20 and the metalens array 30, the polarizer module 20 can be either a liner polarizer or a circular polarizer. The polarizer module 20 is laminated to the E-ink display module 10 using an optically transparent glue 50. The polarizer module 20 needs to be added if polarizer-dependent nanostructures are used to create the metalens. The micro display 10B includes the E-ink display module 10, the polarizer module 20, and the optically transparent glue 50 in the embodiment of FIG. 1B.

Figure 2A:
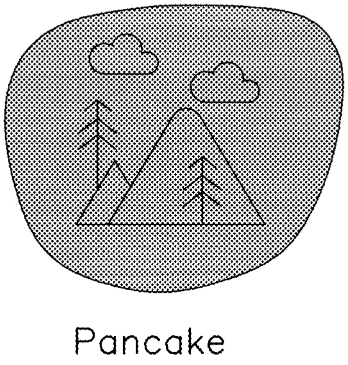
FIGS. 2A-2D illustrate schematics of available technology versus their transparency.
Figure 2B:
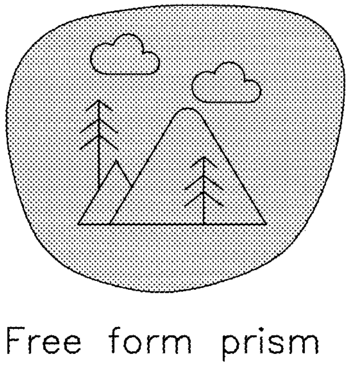
Figure 2C:
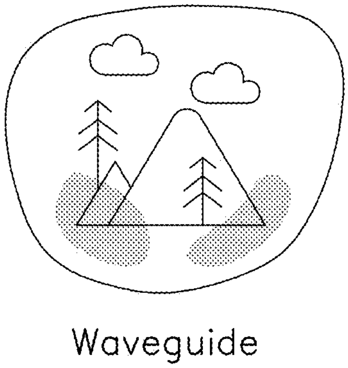
Figure 2D:
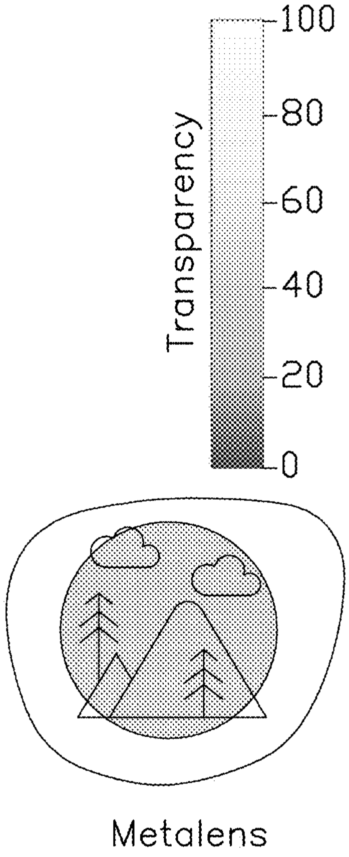

FIGS. 2A-2D illustrate schematics of available technology versus their transparency. As shown in FIG. 2A, a bird bath or a pancake lens with near 20% transparency. FIG. 2B shows a free-form prism with improved transparency. FIG. 2C shows a diffractive waveguide approach with further transparency improvement. Finally, FIG. 2D shows one type of metalens technique with partial outside 100% transparency.

Figure 3A:
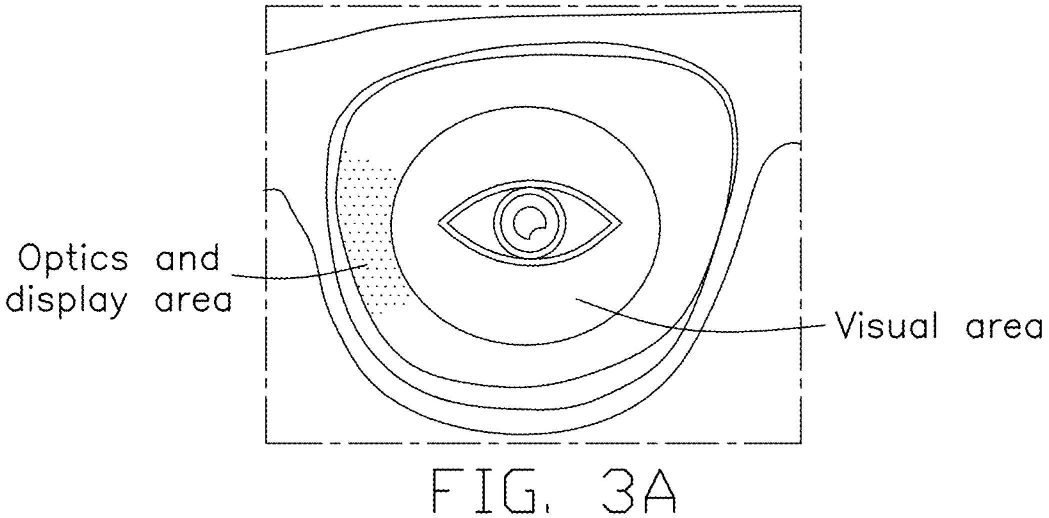
FIGS. 3A-3C illustrate some embodiments of off-center method for placing the display and optics.
Figure 3B:
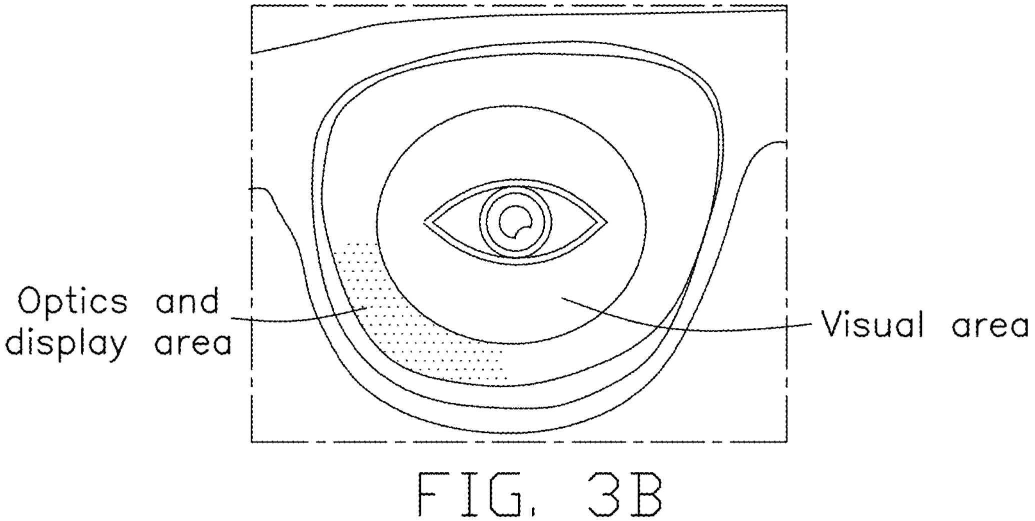
Figure 3C:
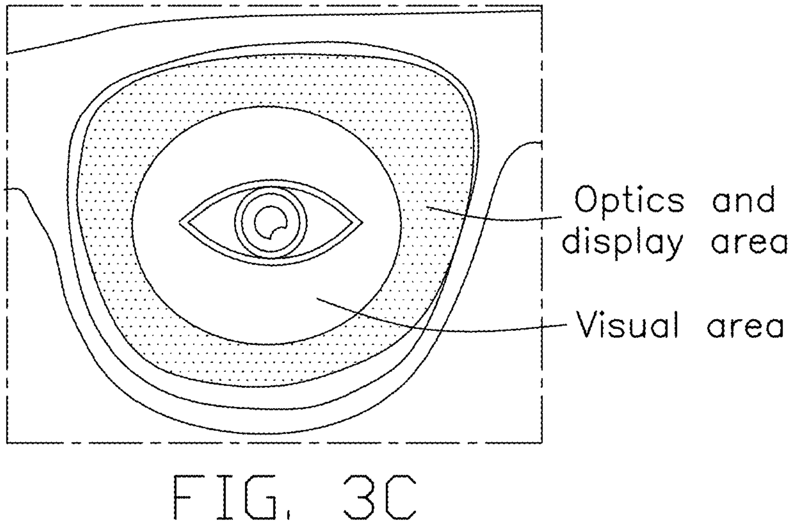

FIGS. 3A-3C represents some embodiments of off-center method for placing the optics (such as the metalens array 30) and display area into a display device. As shown in FIGS. 3A-3C, the optical lens positioned in some types of eyeglasses, such as AR or VR devices. In the optical lens, there is at least one visional area positioned in the center area of the one optical lens.

FIG. 3A represents off-center method for placing the optics and display area (metalens array 30) at the left side of the eyeglasses. FIG. 3B represents off-center method for placing the optics and display area (metalens array 30) at the left corner of the one optical lens. FIG. 3C represents a general off-center method for placing the optics and display area (metalens array 30). As shown, the optics and display area (metalens array 30) can be placed anywhere around the visual area, in one patch, or several patches at different positions or in a form of continuous patch.

Figure 4A:
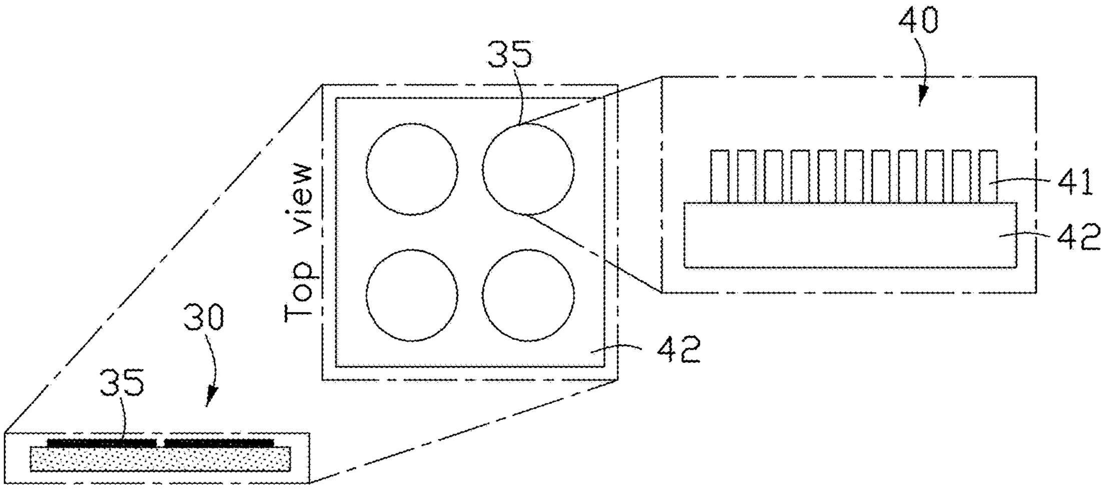
FIGS. 4A-4C illustrate some embodiments of metalens arrays used in the display device.
Figure 4B:
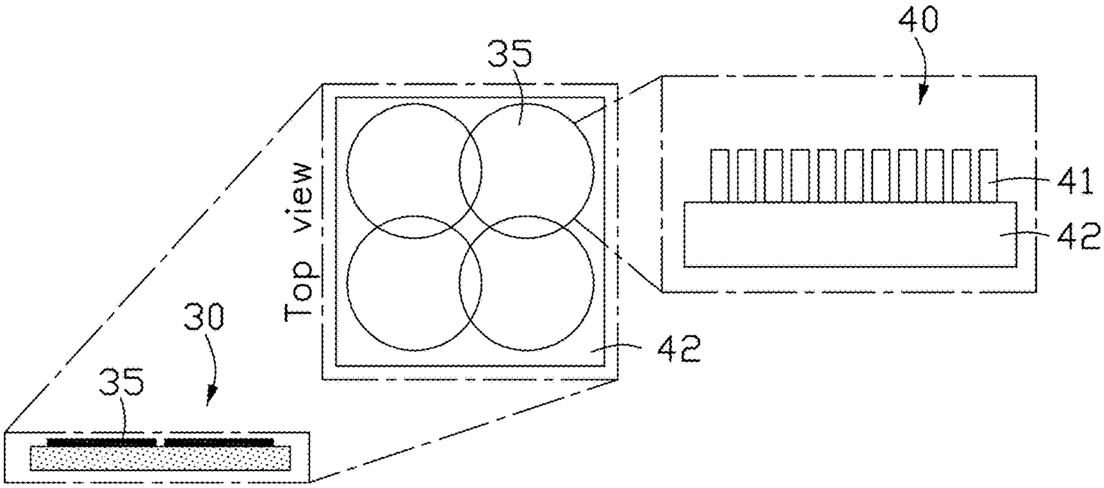
Figure 4C:
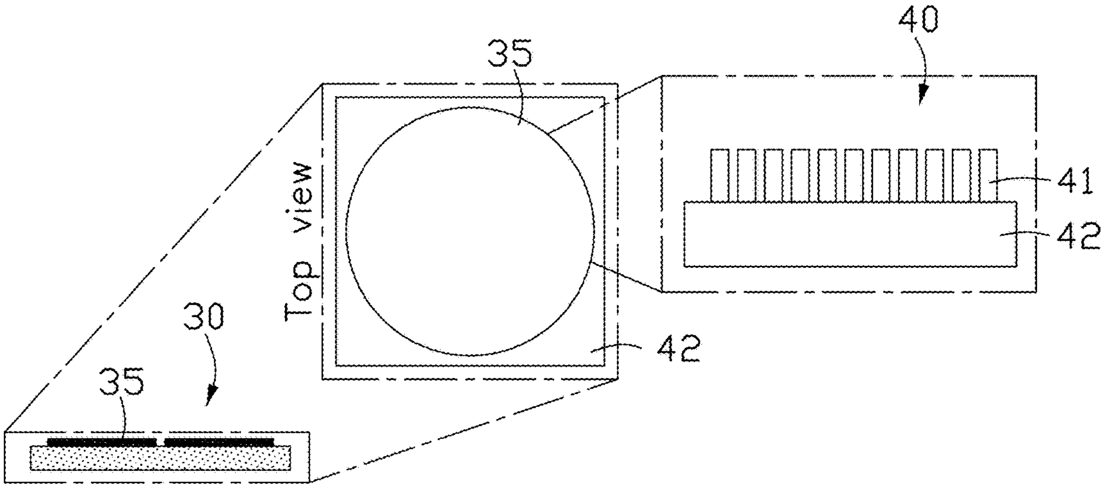

FIGS. 4A-4C show some embodiments of the metalens array 30 used in the display device, such as the AR/MR device. The metalens array 30 represents the optics including at least one optical transparent substrate 42, a plurality of nanostructures 41, and a cladding layer (when the unit cell has an impedance matching cladding layer in some embodiments). The metalens array 30 can be composed of one metalens 35 (single metalens configuration as shown in FIG. 4C) or a plurality of metalenses 35 (metalens-array configuration as shown in FIGS. 4A or 4B). The nanostructures 41 can be fabricated using e-beam lithography (EBL), deep ultraviolet (DUV) photolithography, extreme ultraviolet (EUV) photolithography, or nanoimprint lithography (NIL) and the replica of the master mold in NIL process can be prepared using hard-PDMS (h-PMDS) or a water-soluble polymer like polyvinyl alcohol (PVA) however, not limited to these techniques. As shown in FIG. 4A, there are four metalenses 35 disposed on the at least one optical transparent substrate 42. In the present disclosure, the quantity of the metalenses 35 is not limited. As shown, the plurality of nanostructures 41 are disposed on the at least one optical transparent substrate 42 to form one or more metalenses 35. In one embodiment, the at least one optical transparent substrate 42 can be any type of transparent substrate, such as glass made of fused silica ($SiO_2$) or Sapphire. The plurality of nanostructures 41 are designed and fabricated on the surface of the at least one optical transparent substrate 42 to form the one or more metalenses 35. A zoom area 40 is a zoom-in area of each metalens 35. In some embodiments, the plurality of nanostructures 41 can be arranged in any desired arrangement, such as a grid arrangement or rows arrangement or columns arrangement or any shape arrangement. In some embodiments, the plurality of nanostructures 41 can be made from some passive materials such as dielectric like $TiO_2$, GaN, GaP, SiN, Si, $Nb_2O_5$, $SiO_2$, $Al_2O_3$, $HfO_2$, Poly-Si, curable resin, photoresist, metal oxide nanoparticles and sol-gel mixture, gold (Au), silver (Ag), Aluminum (Al), In another embodiment, the plurality of nanostructures 41 can be made of or combined of phase changing material (GST ($Ge_2Sb_2Te_5$), vanadium dioxide ($VO_2$), and gallium (Ga), metallic polymers), and 2D material (graphene, hBN, $WS_2$) of different thicknesses ranging from 50 nm to a few thousand nanometers for nano pillars however, not limited only to these ranges. As shown in FIG. 4A, each metalens 35 of the metalens array 30 is arranged in a non-overlapping configuration to each other metalens 35.

As shown in FIG. 4B, the metalens array 30 includes a plurality of metalenses 35 and the at least one optical transparent substrate 42. As shown, the each metalens 35 of the metalens array 30 is arranged in an overlapping configuration to each metalens 35 on the at least one optical transparent substrate 42. The at least one optical transparent substrate 42 can be any type of transparent substrate, such as glass made of fused silica ($SiO_2$) or Sapphire. As shown in FIG. 4B, the plurality of nanostructures 41 are designed and fabricated on the surface of the at least one optical transparent substrate 42 so that form the one or more metalenses 35 of the metalens array 30. The quantity of the metalens 35 is not limited by the present application. The plurality of nanostructures 41 define a plurality of metalens arrays 30 which can be arranged in any desired arrangement, such as a grid arrangement or rows arrangement or columns arrangement or any shape arrangement. The plurality of passive nanostructures 41 can be made from materials such as dielectric like $TiO_2$, GaN, GaP, SiN, Si, $Nb_2O_5$, $SiO_2$, $Al_2O_3$, $HfO_2$, Poly-Si, curable resin, photoresist, metal oxide nanoparticles and sol-gel mixture and plurality of active nanostructures 41 can be made of or combined of phase changing material (GST ($Ge_2Sb_2Te_5$), vanadium dioxide ($VO_2$), and gallium (Ga), metallic polymers), and 2D material (graphene, hBN, $WS_2$) of different thicknesses ranging from 100 nm to a few thousand nanometers for nano pillars however, not limited only to these ranges.

As shown in FIG. 4B, each metalens 35 of the metalens array 30 is arranged in an overlapping configuration to each metalens 35.

As shown in FIG. 4C, the metalens array 30 includes a single metalens 35 and the at least one optical transparent substrate 42. The at least one optical transparent substrate 42 can be any type of transparent substrate, such as glass made of fused silica ($SiO_2$) or Sapphire. The plurality of nanostructures 41 are designed and fabricated on the surface of the at least one optical transparent substrate 42 to form the single metalens 35 of the metalens array 30. The zoom area 40 is a zoom-in area of the single metalens 35. The plurality of nanostructures 41 can be arranged in any desired arrangement, such as a grid arrangement or rows arrangement or columns arrangement or any shape arrangement. The plurality of passive nanostructures 41 can be made from materials such as dielectric like $TiO_2$, GaN, GaP, SiN, Si, $Nb_2O_5$, $SiO_2$, $Al_2O_3$, $HfO_2$, Poly-Si, curable resin, photoresist, metal oxide nanoparticles and sol-gel mixture and plurality of active nanostructures 41 can be made of or combined of phase changing material (GST ($Ge_2Sb_2Te_5$), vanadium dioxide ($VO_2$), and gallium (Ga), metallic polymers), and 2D material (graphene, hBN, $WS_2$) of different thicknesses ranging from 100 nm to a few thousand nanometers for nano pillars however, not limited only to these ranges.

In at least one embodiment, the metalens array 30 includes at least one E-ink display module 10 as shown in FIGS. 1A and 1B, the at least one optical transparent substrate 42, a plurality of nanostructures 41 as shown in FIGS. 4A-4C, and at least one spacer 51 as shown in FIGS. 1A and 1B. The plurality of nanostructures 41 are arranged on the at least one optical transparent substrate 42, the plurality of nanostructures 41 define one or more metalenses 35, the one or more metalenses 35 are arranged in a predetermined arrangement, such as the one or more metalenses 35 are arranged in a non-overlapping configuration as shown in FIG. 4A, or the one or more metalenses 35 are arranged in an overlapping configuration as shown in FIG. 4B, or the plurality of nanostructures 41 define a single metalens 35 as shown in FIG. 4C. The at least one spacer 51 connects the at least one E-ink display module 10 and the at least one optical transparent substrate 42, the at least one spacer 51 is disposed between the at least one E-ink display module 10 and the at least one optical transparent substrate 42. The at least one E-ink display module 10 is configured to illuminate light to the plurality of nanostructures 41 and the at least one optical transparent substrate 42.

In at least one embodiment, the metalens array 30 further includes a polarizer module 20 as shown in FIGS. 1A and 1B. The polarizer module 20 is disposed between the at least one E-ink display module 10 and the at least one optical transparent substrate 42, the at least one spacer 51 is positioned between the polarizer module 20 and the at least one optical transparent substrate 42 and the plurality of nanostructures 41, the polarizer module 20 is configured to polarize the light illuminated by the at least one E-ink display module 10.

In at least one embodiment, the metalens array 30 further includes an optically transparent glue 50 as shown in FIGS. 1A and 1B. The optically transparent glue 50 is disposed between the polarizer module 20 and the at least one E-ink display module 10, the polarizer module 20 is laminated to the at least one E-ink display module 10 by the optically transparent glue 50.

Figure 5:
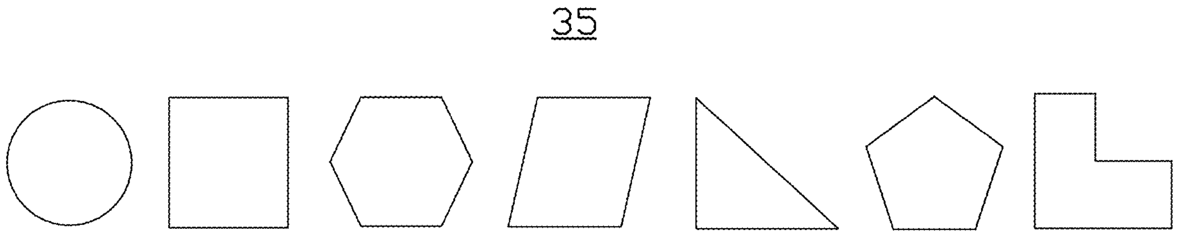
FIG. 5 illustrates one embodiment of a metalens generated in different shapes and outlines.

FIG. 5 illustrates one embodiment of the metalens 35 generated in different shapes and outlines which includes a plurality of isotropic type, anisotropic type, or combination of both isotropic type and anisotropic type of nanostructures 41. The metalens 35 generated in different shapes can be used in the disclosed structures showed in this document. The plurality of nanostructures 41 and the at least one optical transparent substrate 42 can generate different shapes of metalenses 35. The metalens 35 can have different shapes like any ones shown in FIG. 5. The metalenses 35 in different shapes or in the same shape and the at least one optical transparent substrate 42 form the metalens array 30.

In at least one embodiment, each of the plurality of nanostructures 41 may be in an isotropic, an anisotropic, or a combination of isotropic and anisotropic shapes, such as shapes shown in FIG. 5. For example, the isotropic shapes can be circular shape, square shape with the same size no matter from which side to look at them. For example, the anisotropic shapes can be rectangular shape, "L" shape, "H" shape or any shape with different sizes from different sides to look at them. In other embodiments, each of the plurality of the nanostructures 41 can be in other shapes, such as rectangular shape or "H" shape, not limited by the present disclosure.

Figure 6A:
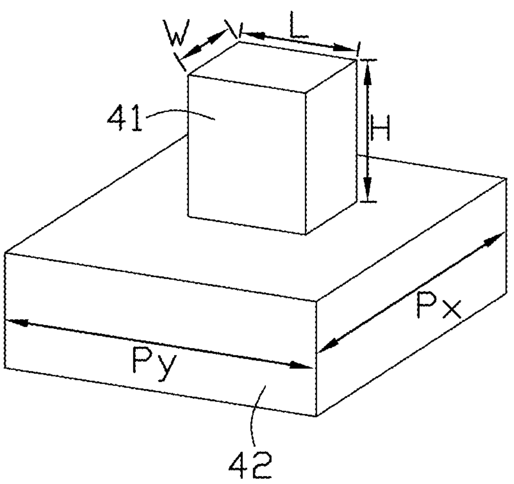
FIGS. 6A-6D illustrate some embodiments of a unit cell of the metalens of the metalens array of FIGS. 4A-4C.

FIG. 6A illustrates one embodiment of a rectangular (or any anisotropic shapes) unit cell of the metalens 35, the rectangular unit cell of the metalens 35 includes a nanostructure 41 with dimensions of width W, length L, height H and the at least one optical transparent substrate 42 with a dimension of pitch Px (along x-direction), and pitch Py (along y-direction). In this disclosure, The metalens array 30 represents the optics including the at least one optical transparent substrate 42 and the nanostructures 41. The metalens array 30 can be composed of one metalens 35 (single metalens configuration) or several metalenses 35 (metalens-array configuration). Each metalens 35 is composed of plurality of unit cells. For example, each metalens 35 is composed of one million of unit cells. If the metalens 35 is composed of the anisotropic nanostructures 41, the polarizer module 20 is needed in the metalens array 30.

Figure 6B:
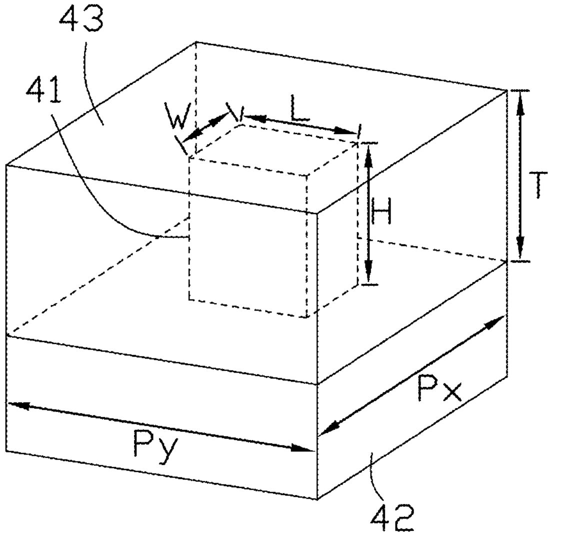

FIG. 6B illustrates one embodiment of a rectangular unit cell of the metalens 35, the rectangular unit cell of the metalens 35 includes the nanostructure 41 with dimensions of width W, length L, height H, a cladding layer 43 with thickness T which is an impedance matching material respect to the substrate's refractive index like a photoresist and at least one optical transparent substrate 42 with a dimension of pitch Px (along x-direction), and pitch Py (along y-direction). The refractive index of the cladding layer 43 could be close to the refractive index of the at least one optical transparent substrate 42. The cladding layer 43 can be spin-coated (or deposited) over the at least one optical transparent substrate 42. The cladding layer 43 can be made from $SiO_2$, resin, photoresist, etc.

Figure 6C:
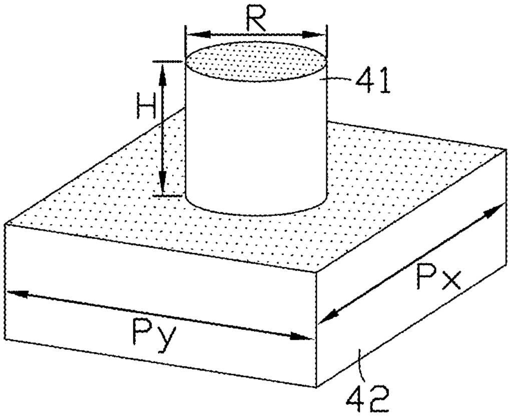

FIG. 6C illustrates one embodiment of a cylinder (or any isotropic shapes) unit cell of the metalens 35 including the nanostructure 41 with dimensions of diameter D, height H, and at least one optical transparent substrate 42 with a dimension of pitch Px (along x-direction), and pitch Py (along y-direction). If the metalens 35 is composed of the isotropic nanostructures 41, the polarizer module 20 is not needed in the metalens array 30.

Figure 6D:
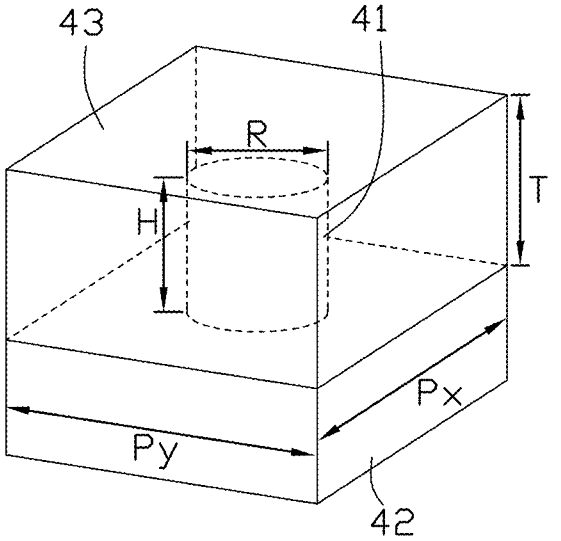

FIG. 6D illustrates one embodiment of a cylinder unit cell of the metalens 35 including the nanostructure 41 with dimensions of diameter D, height H, a cladding layer 43 with thickness T which is an impedance matching material respect to the substrate's refractive index like a photoresist and the at least one optical transparent substrate 42 with a dimension of pitch Px (along x-direction), and pitch Py (along y-direction). The refractive index of the cladding layer 43 could be close to the refractive index of the at least one optical transparent substrate 42. The impedance matching material can boost the efficiency of the metalens and protect the nanostructures as well. The cladding layer 43 can be spin-coated (or deposited) over the at least one optical transparent substrate 42. The cladding layer 43 can be made from $SiO_2$, resin, photoresist, etc. It needs mentioning that a combination of isotropic and anisotropic nanostructures 41 is also feasible.

In at least one embodiment, FIGS. 6A-6D may illustrate at least one cell of a passive metalens of the metalens array 30 of FIGS. 4A-4C, there should be a plurality of unit cells forming the metalens (such as the one or more metalens 35 as shown in FIGS. 4A-4C), and there are a plurality of metalenses forming the metalens array (such as the one or more metalenses 35 forming the metalens array 30 as shown in FIGS. 4A-4C); or the metalens array 30 is formed by arranging a plurality of metalenses 35, and each metalens 35 is formed by arranging a plurality of unit cells.

In some embodiments, the unit cells of the metalens array 30 may be in a same size or in different sizes. For example, three or more different unit cells may be used, because different pitch, width, length is required for each color but the same height for all colors. However, in some special embodiments, the same unit cell (the same pitch) for all colors (with different widths and lengths, but the same height) can be used.

In at least one embodiment, the plurality of nanostructures 41 may be in various shapes and arrangements. For instance, in one embodiment, the plurality of nanostructures 41 are in a same shape and arranged in different geometrical phases. In another embodiment, the plurality of nanostructures 41 are in a same shape but with different sizes. In another embodiment, the plurality of nanostructures 41 are in different shapes and different sizes.

Figure 7A:
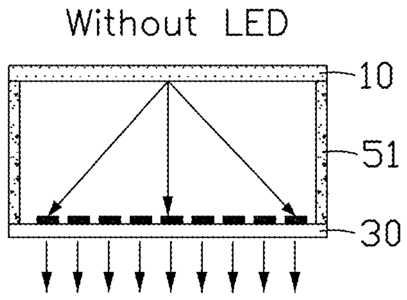
FIGS. 7A-7C illustrate some embodiments of a display device including the metalens array and the E-ink display module.
Figure 7B:
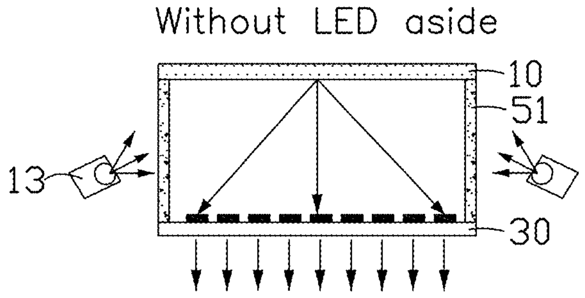
Figure 7C:
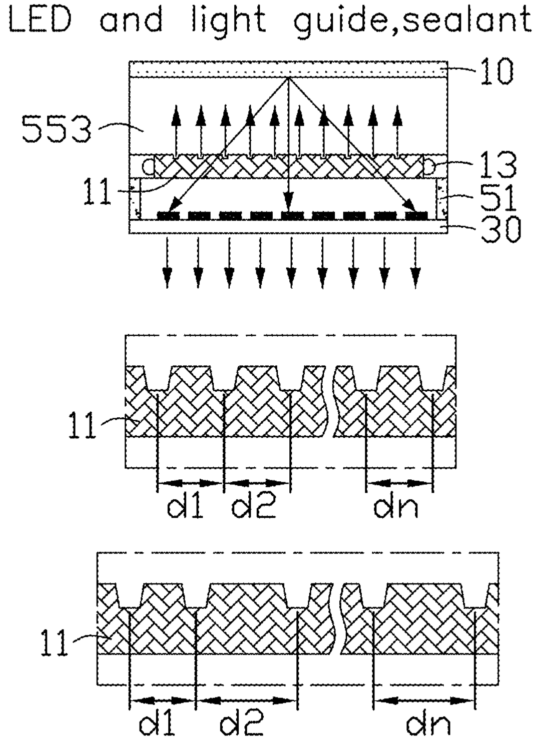

FIGS. 7A-7C as discussed in the beginning only a highly bright transparent display (>3000 nits) can be used for outdoor activities in see-through glasses (like AR glasses) which make user's eye prone to damage easily. Therefore, utilizing extremely bright display is not an ultimate solution. On the other side, E-ink display which are reflective displays (~ 40%) and do not have backlight and can be readily illuminated via a simple LED arrangement. In other words, the reflective light does not strike the eyes directly and makes the user feel comfortable looking at an E-ink display for hours. Therefore, outdoor activities during a sunny day is no longer an issue, on top of that, E-ink displays are very power efficient and frequent and daily recharging the battery is no longer needed.

FIG. 7A illustrates one embodiment of the metalens array 30 and the E-ink display module 10 applied to an optical device or a display device such as AR/MR device (not shown in the FIGS. 7A-7C). As shown in FIG. 7A, the optical device or the display device includes at least one spacer 51 disposed between the E-ink display module 10 and the metalens array 30. In one embodiment, the E-ink display module 10 can be any type of E-ink displays without LEDs installed, such as mono-color, multi-color, or full-color. The optical device or the display device shown in FIG. 7A can be integrated to glasses or designed to be in form of a clipping device which can be attached (hanged) to typical glasses.

As shown in FIG. 7A, some sounding light can pass through the at least one spacer 51 to the E-ink display module 10. The surrounding light will be reflected by the E-ink display module 10, then change the light direction to the metalens array 30. The eyes can see the light reflected by the E-ink display module 10.

FIG. 7B illustrates one another embodiment of the optical device or the display device including the metalens array 30 and the E-ink display module 10. The optical device or the display device includes at least one spacer 51 disposed between the E-ink display module 10 and metalens array 30. In addition, the optical device includes at least one LED 13 positioned around the glasses frame or glasses elbow or nose bridge. In one embodiment, the at least one LED 13 can be utilized or a plurality of LEDs 13 can be utilized. The back-light LED can have different colors and tunings for instance from warm to cold temperature. One or the plurality of LEDs can be placed in different positions. In one embodiment, the E-ink display module 10 can be any type of E-ink displays, such as mono-color, multi-color, or full-color. The optical device or the display device shown in FIG. 7B can be integrated to glasses or designed to be in form of a clipping device which can be attached (hanged) to typical glasses. As shown in FIG. 7B, at least one LED 13 emits a plurality of light beams to the direction of the E-ink display module 10, the plurality of light beams will be reflected by the E-ink display module 10, then change the light direction of the plurality of light beams to the metalens array 30. The eyes can see the plurality of light beams reflected by the E-ink display module 10.

FIG. 7C illustrates another embodiment of the optical device or the display device using the metalens array 30, a light guide 11 and the E-ink display module 10. As shown in FIG. 7C, the optical device or the display device includes at least one spacer 51 disposed between the light guide 11 and metalens array 30. In addition, the optical device includes sealant 553 whose refractive index is lower than light-guide to let the light escape from the total internal reflection (TIR) inside the light-guide. The sealant 553 can be used by a sealant glue or replaced by air. The light guide 11 is positioned between the E-ink display module 10 and metalens array 30. The out-couplers of the light-guide 11 can be spaced uniformly ($d_1=d_2=d_n$) or with different spacings ($d_1 \neq d_2 \neq d_n$) as shown in FIG. 7C. The light guide 11 uniformly distribute the light over the E-ink display module 10.

At least one LED 13 and spacer 51 are positioned between the E-ink display module 10 and metalens array 30. In one embodiment, at least one LED 13 or a plurality of LEDs 13 can be utilized. The back-light LED can have different colors and tunings for instance from warm to cold temperature. One LED 13 or the plurality of LEDs 13 can be placed in different positions. In one embodiment, the E-ink display module 10 can be any type of E-ink displays, such as mono-color, multi-color, or full-color. The E-ink display can be used to the display module shown in FIG. 1A or FIG. 1B. The optical device shown in FIG. 7A-7C can be integrated to glasses or designed to be in form of a clipping device which can be attached (hanged) to typical glasses.

In at least one embodiment, the metalens array 30 further includes at least one light guide 11 as shown in FIG. 7C. The at least one light guide 11 is disposed between the at least one E-ink display module 10 and the at least one optical transparent substrate 42 and the plurality of nanostructures 41, the at least one light guide is configured to uniformly distribute lights over the at least one E-ink display module 10.

Figure 8A:
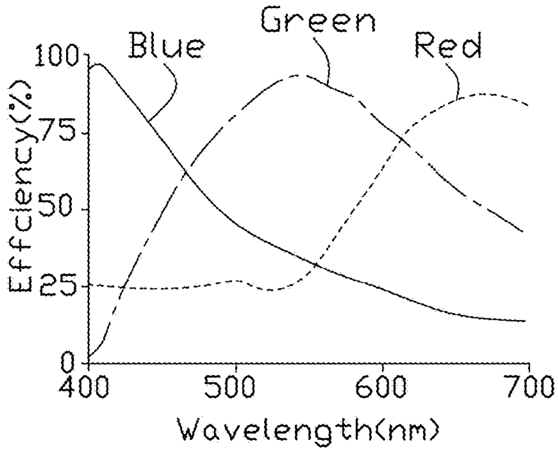
FIG. 8A illustrates an embodiment of an efficiency of three different metasurfaces.

FIG. 8A illustrates an efficiency of three different $TiO_2$ metasurfaces for blue, green, and red spectra.

Figure 8B:
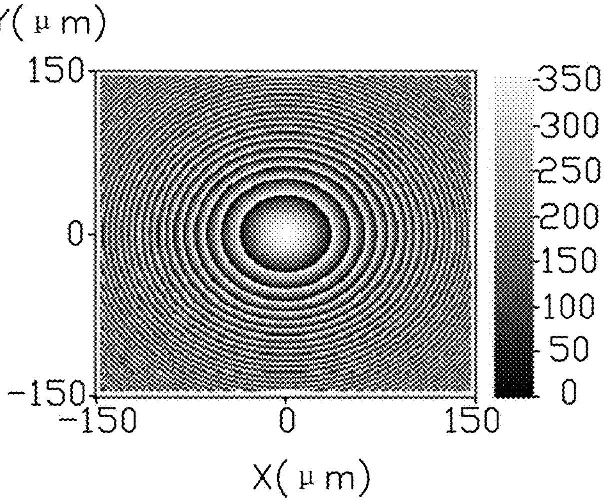
FIG. 8B illustrates an embodiment of a phase profile of the metalens.

FIG. 8B illustrates a phase profile of a 300 μm diameter metalens with polar incident angle θ=0°, and azimuthal angle of Φ=0°. Where θ is the on-or-off axis focusing angle and Φ is the azimuthal angle as described in the Eq. 1. This design is like the prior art shown in FIG. 2D which influence the forward view of the user.

Figure 8C:
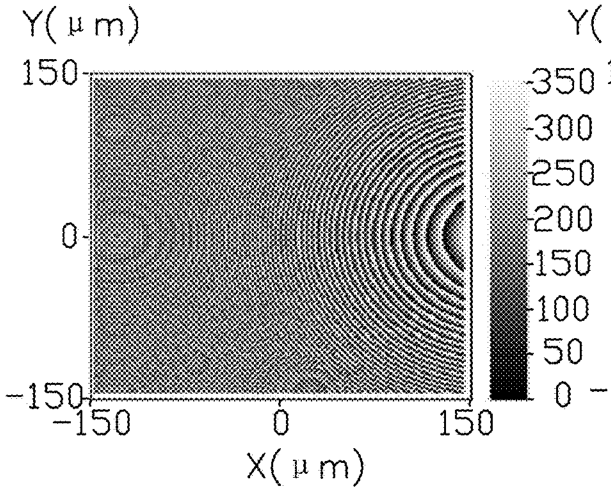
FIG. 8C illustrates another embodiment of a phase profile of the metalens.

FIG. 8C illustrates a phase profile of a 300 μm diameter metalens with polar incident angle θ=10°, and azimuthal angle of Φ=90°. Where θ is the on-or-off axis focusing angle and Φ is the azimuthal angle as described in the Eq. 1.

Figure 8D:
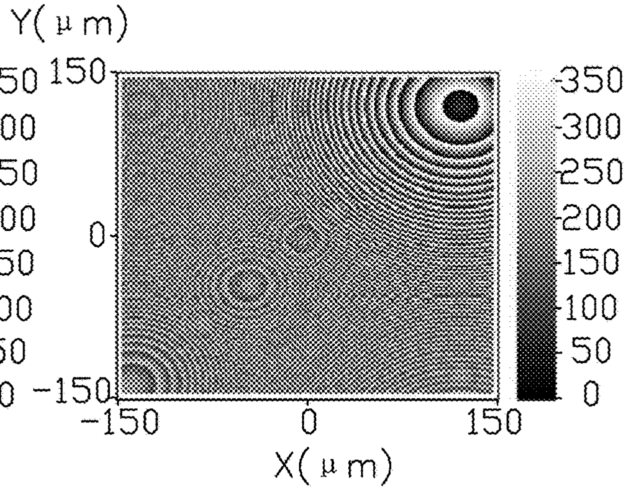
FIG. 8D illustrates another embodiment of a phase profile of the metalens.

FIG. 8D illustrates a phase profile of a 300 μm diameter metalens with polar incident angle θ=10°, and azimuthal angle of Φ=45°. Where θ is the on-or-off axis focusing angle and Φ is the azimuthal angle as described in the Eq. 1. The phase retardation of the metalens can be written in different forms, for instance one of the common formulas is given as:

$$\varphi(r,\ \lambda_i) = \frac{2\pi}{\lambda_i}\left(f - \sqrt{f^2 + r^2 - 2r^2 f\ \mathrm{Sin}\theta_i \mathrm{Cos}\Phi}\right) + \varphi_c(\lambda_i) + C(\lambda_i) \qquad \text{Eq. 1}$$

$$r = \sqrt{x^2 + y^2} \qquad \text{Eq. 2}$$

$$\varphi_c(\lambda_i) = \frac{2\pi}{\lambda_i}\sqrt{x^2 + + y^2}\,\mathrm{Sin}\alpha \qquad \text{Eq. 3}$$

Where f is the focal length of the metalens, r indicates the position of each nanostructures to the metalens center and defined as written in Eq. 2, $\theta_i$ is the on-or-off axis focusing angle, i is the index of operating wavelength, Φ is the azimuthal angle, $\varphi_c(r, \lambda_i)$ is the off-axis aberration compensation phase term, $C(\lambda_i)$ is a constant phase to further tune the phase which can be optimized through particle swarm optimization (PSO) algorithm, α is the collimating angle.

Figure 9:
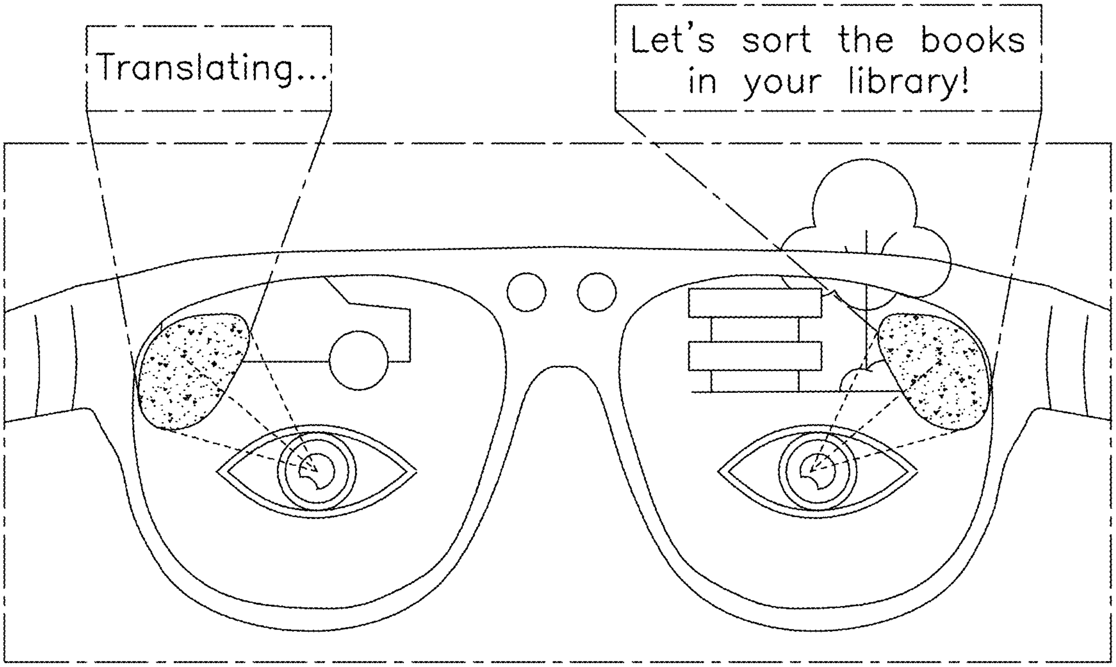
FIG. 9 illustrates an embodiment of a schematic of the metalens array and the E-ink display module combination for a simple application using the AR/MR device.

FIG. 9 illustrates a schematic of the proposed metalens array 30 and the E-ink display module 10 combination for a simple application using the AR/MR device. Each one of the metalens array 30 can be combined and placed into different positions and different glasses of the AR/MR device. As shown, the each one of the metalens array 30 is displayed different information respectively.

Figure 10A:
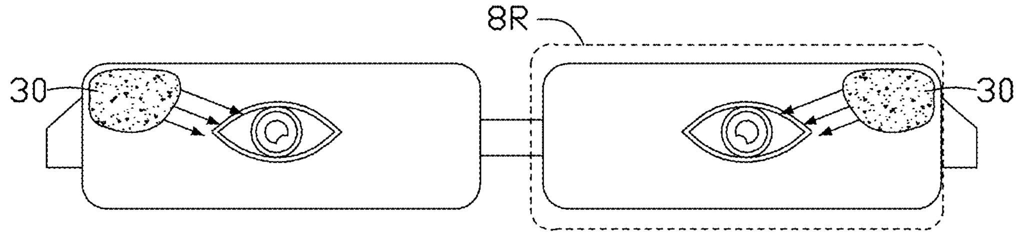
FIGS. 10A-10D illustrate some embodiments of a front view of the display device.

FIG. 10A represents on embodiment of a front view of the proposed optical device or display device applied in the AR/MR device. As shown in FIG. 10A, a glass module 8R is used in the AR/MR device. The glass module 8R shows the at least one metalens array 30 (including the E-ink display module 10 or an E-ink display module) combined with the clear glass zone. The ambient light of surroundings passes though the clear glass zone to eyes. In addition, the light generated or reflected by the E-ink display module 10 is directly transmitted to the direction of the eyes.

Figure 10B:
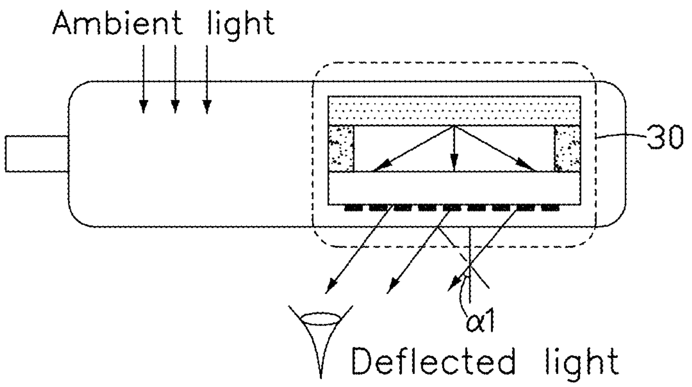

FIG. 10B represents one another embodiment of the glass module 8R includes the at least one optical device shown in FIGS. 7A-7C in the presented AR/MR glasses. This works well when the metalens position is not very off the center of the glasses. The displayed content is transferred and deflected by a metalens (any ones shown in this document) to the user's eye with uniform deflected angle of $\alpha_1$.

Figure 10C:
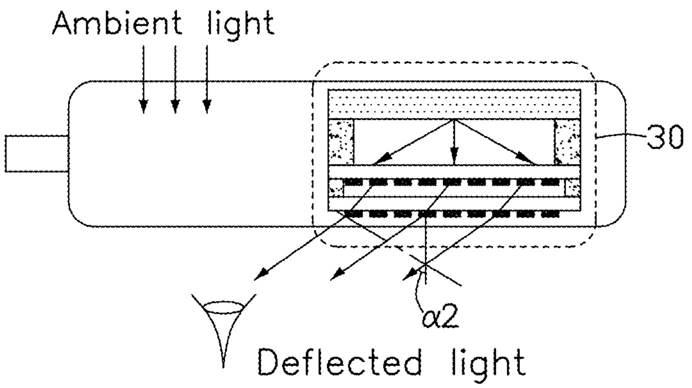

FIG. 10C represents one another embodiment of the glass module 8R. The glass module 8R includes the at least one optical device shown in FIGS. 7A-7C in the presented AR/MR device. This works well when the metalens position is at one of the corners of the glasses far off the center of the glasses. The displayed content is transferred and deflected by a doublet or double-layer metalens set to the user's eye with uniform deflected angle of $\alpha_2$, where $\alpha_2 > \alpha_1$. The two-layers based metalens optical device can be prepared in different ways, either on one substrate or two individual substrates, and facing the E-ink display or not, see FIG. 12B-12D for more detail.

Figure 10D:
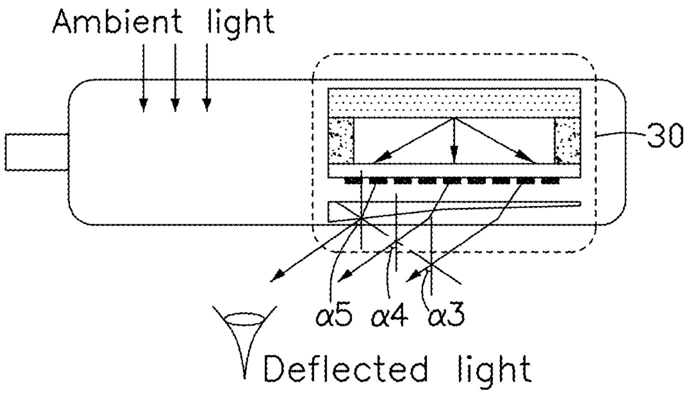

FIG. 10D represents the glass module 8R using one metalens array 30 in the AR/MR device plus a wedge prism. This design requires only one metalens array 30 and the wedge prism can work as refractive like FIG. 11A or refractive-converging like FIG. 11B in case if the display area is large and needs to be focused towards user's eyes. The displayed content is transferred and deflected by a single metalens array (any ones shown in FIGS. 4A-4C) or doublet or double-layer metalens set (any ones shown in FIGS. 12A-12D) to the user's eye with non-uniform deflected angle of $\alpha_3$, $\alpha_4$, $\alpha_5$. The optical wedge is used to help metalens set not only for further deflection angle but also to correct the optical aberration and wave-front of the beams came from the metalens set.

Figure 11A:
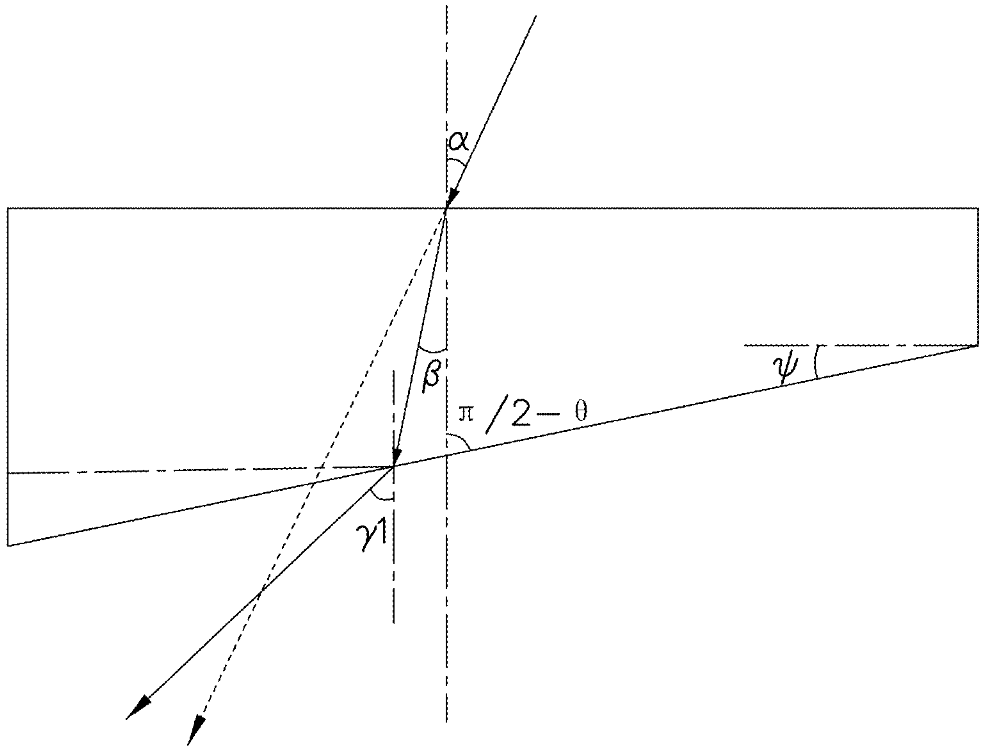
FIG. 11A illustrates an embodiment of a wedge prism for the application of the light steering in FIG. 10D.

FIG. 11A represents one embodiment of a wedge prism for the application of the light steering in FIG. 10D. The wedge prism can be made from any transparent materials to optical wavelengths like glass, acrylic, and fluorite. ψ is the angle between the prism's surfaces, α is the indecent angle, β is refracted angle, $\gamma_1$ is exiting angle from the wedge prism.

Figure 11B:
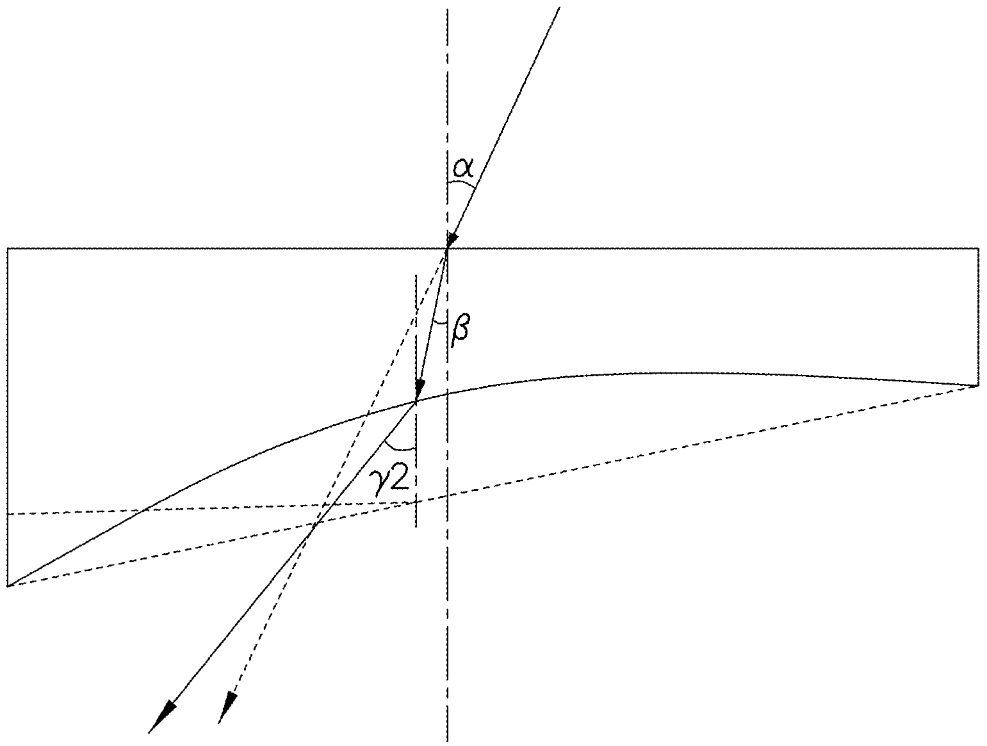
FIG. 11B illustrates an embodiment of a free-form wedge prism with a free-form surface.

FIG. 11B represents one embodiment of a free-form wedge prism with a free-form surface to correct the aberration and distortion created by the metalenses before the beams reach the user's eyes, for example a parabolic curved surface for the application of the light steering in FIG. 10D. When the display is large converging the light not to the focusing point is required. The wedge prism can be made from any transparent materials to optical wavelengths like glass, acrylic, and fluorite. α is the indecent angle, β is refracted angle, $\gamma_2$ is exiting angle from the free-form wedge prism.

Figure 12A:
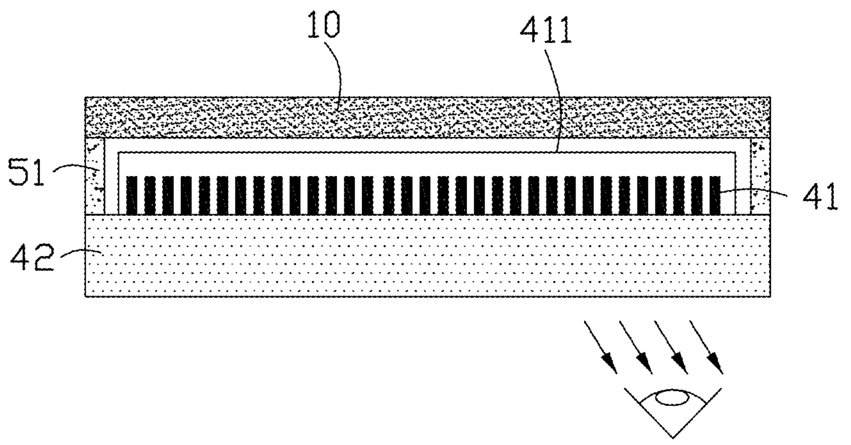
FIGS. 12A-12D illustrate some embodiments of some types of the metalens array.

In one embodiment, FIG. 12A shows a type of single-layer based metalens array applied in the optical device in detail, unlike FIG. 10B the nanostructures 41 face the E-ink display module 10. As shown in FIG. 12A, one single-layer metalens array 411 composed by the nanostructures 41, the one single-layer metalens array 411 disposed on the at least one optical transparent substrate 42. The spacer 51 is disposed between the E-ink display module 10 and the at least one optical transparent substrate 42. The eyes can see the light which is emitted or reflected from the E-ink display module 10 and passed to the metalens array 411 and the at least one optical transparent substrate 42. The nanostructures 41 can either face the E-ink display module 10 (like FIG. 12A) or face the user's eyes (like FIG. 10B).

Figure 12B:
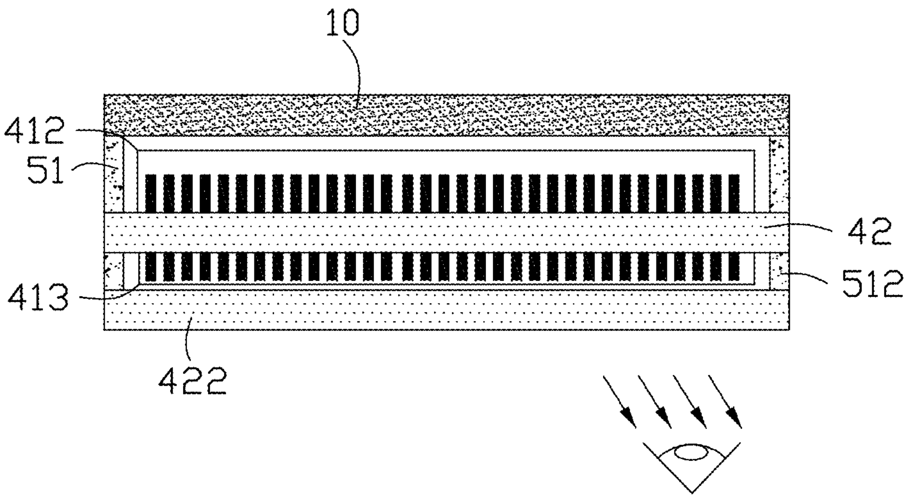

As shown in FIG. 12B, two layers of metalens array 412, 413 are composed by the nanostructures 41. The two layers of metalens array 412, 413 are disposed on two opposite sides of the at least one optical transparent substrate 42. One of the two layers of metalens is an upper layer of metalens array 412, and the other one is a down layer of metalens array 413. As shown, the spacer 51 is positioned between the E-ink display module 10 and the at least one optical transparent substrate 42. The spacer 512 is positioned between the at least one optical transparent substrate 42 and the transparent protection film/substrate 422. The upper side metalens array 412 represents nanostructures of a metalens, the downside metalens array 413 represents nanostructure of either a deflecting metasurface or a metalens. The eyes can see the light which is emitted or reflected from the E-ink display module 10 and passed to the metalens array 412, 413 and the substrates 42 and the transparent protection film/substrate 422. In some embodiments, the at least one optical transparent substrate 42 could be any type of flexible transparent materials, such as water-soluble polymer like polyvinyl alcohol (PVA). The transparent protection film/substrate 422 could be any type solid transparent film or glass, or any type of flexible transparent materials, such as water-soluble polymer like polyvinyl alcohol (PVA).

Figure 12C:
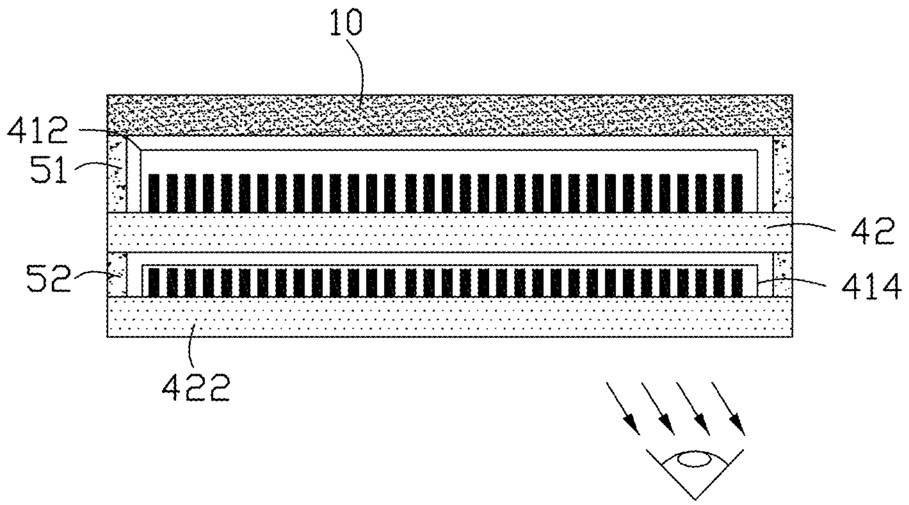

FIG. 12C shows another type of optical device of FIG. 10C in detail. As shown in FIG. 12C, when two metalenses array 412, 414 or one metalens array 412 and one deflecting metasurface 414 are used. The two layers of metalens array 412, 414 are disposed on the same side of the at least one optical transparent substrate 42 and the transparent protection film/substrate 422 respectively. One of the two layers of metalens is an upper layer of metalens array 412, and the other one is a second upper layer of metalens array 414. The second upper layer of metalens array 414 is either a deflecting metasurface or a metalens. As shown, the spacer 51 is positioned between the E-ink display module 10 and the at least one optical transparent substrate 42. The spacer 52 is positioned between the at least one optical transparent substrate 42 and the transparent protection film/substrate 422. The eyes can see the light which is emitted or reflected from the E-ink display module 10 and passed to the metalens array 412, 414 and the substrates 42 and the transparent protection film/substrate 422. In some embodiments, the at least one optical transparent substrate 42 could be any type of flexible transparent materials, such as water-soluble polymer like polyvinyl alcohol (PVA). The transparent protection film/substrate 422 could be any type solid transparent film or glass, or any type of flexible transparent materials, such as water-soluble polymer like polyvinyl alcohol (PVA).

Figure 12D:
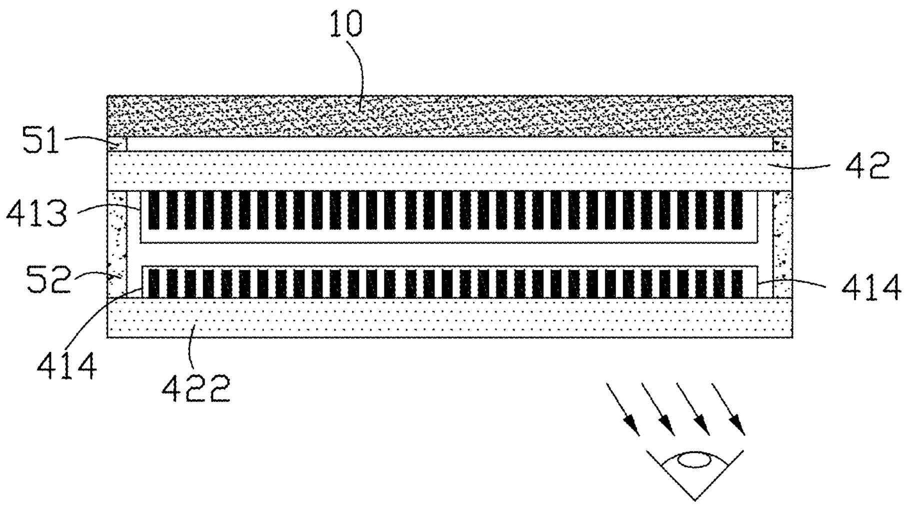

FIG. 12D shows another type of the optical device, when two metalenses array 413, 414 or one metalens array 413 and one deflecting metasurface array 414 are used. The two layers of metalens array 413, 414 are disposed on the different side of the at least one optical transparent substrate 42 and the transparent protection film/substrate 422 respectively. One of the two layers of metalens is the down layer of metalens array 413 disposed on the at least one optical transparent substrate 42, and the other one is the second upper layer of metalens array 414 disposed on the transparent protection film/substrate 422. The second upper layer of metalens array 414 is either a deflecting metasurface or a metalens. As shown, the spacer 51 is positioned between the E-ink display module 10 and the at least one optical transparent substrate 42. The spacer 52 is positioned between the at least one optical transparent substrate 42 and the transparent protection film/substrate 422. The eyes can see the light which is emitted or reflected from the E-ink display module 10 and passed to the metalens array 413, 414 and the substrates 42 and the transparent protection film/substrate 422. In some embodiments, the at least one optical transparent substrate 42 could be any type of flexible transparent materials, such as water-soluble polymer like polyvinyl alcohol (PVA). The transparent protection film/substrate 422 could be any type solid transparent film or glass, or any type of flexible transparent materials, such as water-soluble polymer like polyvinyl alcohol (PVA).

In at least one embodiment, the display device or the optical device includes at least one glass and the metalens array 30. The metalens array 30 is combined with the at least one glass, such as shown in FIGS. 10A-10C. The metalens array 30 may be the any metalens array 30 as shown in FIGS. 4A-4C, 7A-7C, and 12A-12D.

In at least one embodiment, the display device or the optical device further includes at least one LED 13 as shown in FIG. 7B. The at least one LED 13 is positioned around the at least one glass, the at least one LED 13 is configured to emit a plurality of light beams to a direction to the at least one E-ink display module 10, the at least one E-ink display module 10 is further configured to reflect the plurality of light beams to the plurality of nanostructures 41 and the at least one optical transparent substrate 42.

Figure 13A:
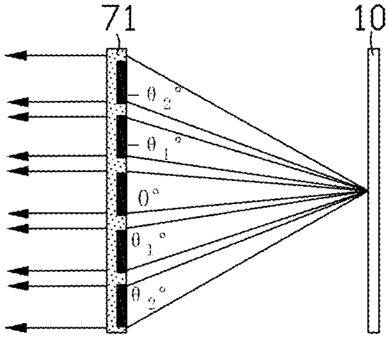
FIGS. 13A-13H illustrate some embodiments of the metalens array with different collimating properties, different deflecting properties, and different converging properties.
Figure 13B:
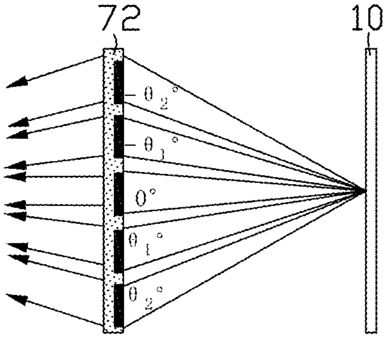
Figure 13C:
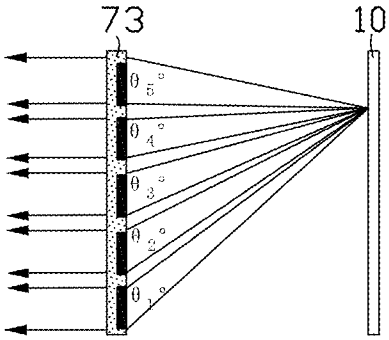
Figure 13D:
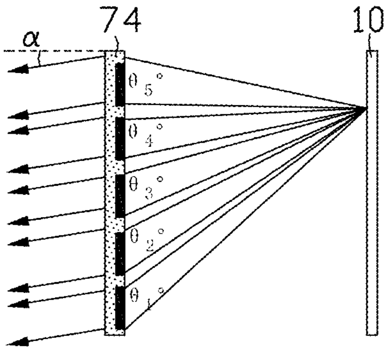
Figure 13E:
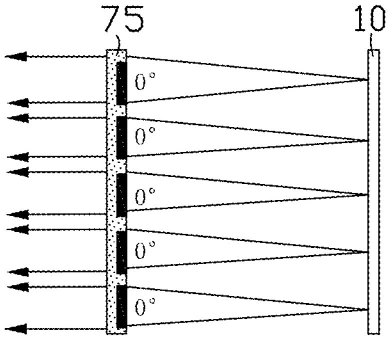
Figure 13F:
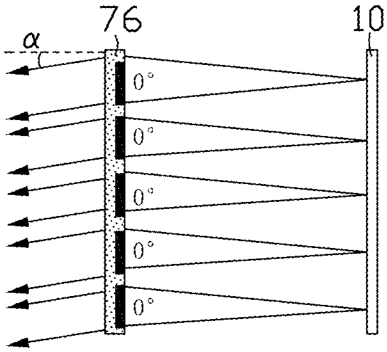
Figure 13G:
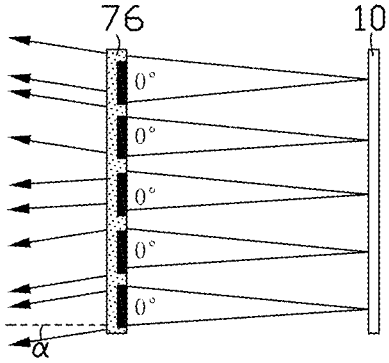
Figure 13H:
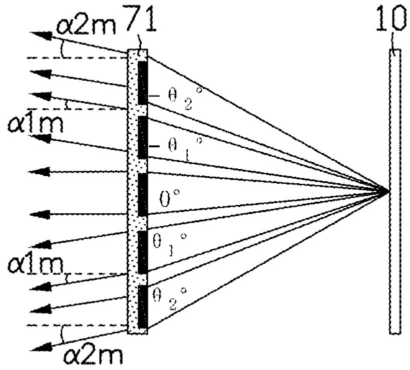

FIGS. 13A-13H illustrate some embodiments of the metalens array with different collimating properties, different deflecting properties, and different converging properties. The plurality of overlapping metalens array or metalens array 71, 72, 73, 74, 75, 76 can be either one presented in FIGS. 12A-12D. The E-ink display module 10 with or without a polarizer module depends on the type of metalens array (isotropic or anisotropic). FIG. 13A, FIG. 13E, FIG. 13G, and FIG. 13H are on-axis design and the rest are off-axis scheme. The output light illuminated from the E-ink display module 10 and passed through the metalens array 71-76 can be collimated, inclined, diverged, or converged. The FIG. 13B is preferable when a large E-ink display module 10 and proportionally a large overlapping metalens array 72 is used, therefore, light beam needs to be focused on user's eyes otherwise some part of the displayed contents cannot be seen by the user. FIG. 13C, FIG. 13D, and FIG. 13F can be also utilized when the E-ink display module 10 is vertically displaced to improve the visibility of the ambient light. FIG. 13E, FIG. 13G, and FIG. 13H are on axis scheme with various diopters.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A metalens array module comprising:

at least one E-ink display module;

at least one optical transparent substrate;

a plurality of nanostructures arranged on the at least one optical transparent substrate, the plurality of nanostructures defining one or more metalenses, the one or more metalenses arranged in a predetermined arrangement;

at least one spacer connecting the at least one E-ink display module and the at least one optical transparent substrate, the at least one spacer disposed between the at least one E-ink display module and a surface of the at least one optical transparent substrate having the plurality of nanostructures arranged thereon; and at least one light guide disposed between the at least one E-ink display module and the at least one optical transparent substrate and the plurality of nanostructures, wherein the at least one light guide is configured to uniformly distribute lights to the at least one E-ink display module, and the at least one E-ink display module is configured to reflect the lights projected by the at least one light guide to the plurality of nanostructures.

2. The metalens array module according to claim 1, further comprising a polarizer module, wherein the polarizer module is disposed between the at least one E-ink display module and the at least one optical transparent substrate, the at least one spacer is positioned between the polarizer module and the at least one optical transparent substrate and the plurality of nanostructures, the polarizer module is configured to polarize light illuminated by the at least one E-ink display module.

3. The metalens array module according to claim 2, further comprising an optically transparent glue, wherein the optically transparent glue is disposed between the polarizer module and the at least one E-ink display module, the polarizer module is laminated to the at least one E-ink display module by the optically transparent glue.

4. The metalens array module according to claim 1, wherein the one or more metalenses are arranged in a non-overlapping configuration.

5. The metalens array module according to claim 1, wherein the one or more metalenses are arranged in an overlapping configuration.

6. The metalens array module according to claim 5, wherein each of the plurality of nanostructures is in an isotropic, an anisotropic, or a combination of isotropic and anisotropic shapes.

7. The metalens array module according to claim 1, wherein the plurality of nanostructures are in a same shape and arranged in different geometrical phases.

8. The metalens array module according to claim 1, wherein the plurality of nanostructures are in a same shape but with different sizes.

9. The metalens array module according to claim 1, wherein the plurality of nanostructures are in different shapes and different sizes.

10. A display device comprising:

at least one glass; and a metalens array module combined with the at least one glass, the metalens array module comprising:

at least one E-ink display module;

at least one optical transparent substrate;

a plurality of nanostructures arranged on the at least one optical transparent substrate, the plurality of nanostructures defining one or more metalenses, the one or more metalenses arranged in a predetermined arrangement;

at least one spacer connecting the at least one E-ink display module and the at least one optical transparent substrate, the at least one spacer disposed between the at least one E-ink display module and a surface of the at least one optical transparent substrate having the plurality of nanostructures arranged thereon; and at least one light guide disposed between the at least one E-ink display module and the at least one optical transparent substrate and the plurality of nanostructures, wherein the at least one light guide is configured to uniformly distribute lights to the at least one E-ink display module, and the at least one E-ink display module is configured to reflect the lights projected by the at least one light guide to the plurality of nanostructures.

11. The display device according to claim 10, wherein the metalens array module further comprises a polarizer module, the polarizer module is disposed between the at least one E-ink display module and the at least one optical transparent substrate, the at least one spacer is positioned between the polarizer module and the at least one optical transparent substrate and the plurality of nanostructures, the polarizer module is configured to polarize light illuminated by the at least one E-ink display module.

12. The display device according to claim 11, wherein the metalens array module further comprises an optically transparent glue, the optically transparent glue is disposed between the polarizer module and the at least one E-ink display module, the polarizer module is laminated to the at least one E-ink display module by the optically transparent glue.

13. The display device according to claim 10, wherein the one or more metalenses are arranged in a non-overlapping configuration or an overlapping configuration.

14. The display device according to claim 13, wherein each of the plurality of nanostructures is in an isotropic, an anisotropic, or a combination of isotropic and anisotropic shapes.

15. The display device according to claim 10, wherein the plurality of nanostructures are in a same shape and arranged in different geometrical phases.

16. The display device according to claim 10, wherein the plurality of nanostructures are in a same shape but with different sizes.

17. The display device according to claim 10, wherein the plurality of nanostructures are in different shapes and different sizes.

18. The display device according to claim 10, further comprising at least one LED, wherein the at least one LED is positioned around the at least one glass, the at least one LED is configured to emit a plurality of light beams to a direction to the at least one E-ink display module, the at least one E-ink display module is further configured to reflect the plurality of light beams to the plurality of nanostructures and the at least one optical transparent substrate.

* * * * *